July 30, 1968  N. PETERS  3,395,323
ELECTRICAL MOTOR POSITIONING SYSTEM
Filed Aug. 20, 1964  4 Sheets-Sheet 1

INVENTOR.
NICHOLAS PETERS
BY
*Curtis Ailes*
ATTORNEY

INVENTOR.
NICHOLAS PETERS
BY *Curtis Ailes*
ATTORNEY

N. PETERS 3,395,323

ELECTRICAL MOTOR POSITIONING SYSTEM

Filed Aug. 20, 1964

INVENTOR.
NICHOLAS PETERS

BY *Curtis Ailes*

ATTORNEY

United States Patent Office 3,395,323
Patented July 30, 1968

3,395,323
ELECTRICAL MOTOR POSITIONING SYSTEM
Nicholas Peters, 15 Lorelei Drive,
Yorktown Heights, N.Y. 10598
Filed Aug. 20, 1964, Ser. No. 390,797
3 Claims. (Cl. 318—31)

ABSTRACT OF THE DISCLOSURE

An electrical motor positioning system including a plurality of electrical contact brush members and segmented electrical contacts forming a commutator for cooperation with the brush members. An electrically controlled motor is connected for movement with the commutator. The commutator includes at least one insulated dwell segment between adjacent ones of the electrical contact segments, the contact segments adjacent to said dwell segment being electrically connected respectively for controlling forward and reverse motion of the motor when power is applied thereto through a selected one of the brush members to thereby move the dwell segment to the selected brush member. Another one of the brush members is always positioned on one of the commutator segments and ready for future selection when the dwell segment is positioned under the selected brush member.

---

This invention relates to electrically controllable physical positioning systems, and more particularly to electrically controllable positioning systems which are characterized by simplicity of construction, precision in operation, and low standby power requirements.

Many electrically controllable positioning systems have been devised in the past for accomplishing various positioning functions such as for remotely controlling the aim of guns, remotely indicating various measurements, remotely and electrically positioning the controls of various vehicles, remotely operating electrical selector switches, and for many other purposes. Such systems are sometimes referred to generally as positioning servo systems.

Many problems have been encountered in the design and production of electrical positioning systems of prior construction. Frequently, they have been very complex in construction and consequently very expensive and often bulky in physical dimensions. Furthermore, with the prior systems, when a desired position is achieved, considerable power consumption is often required to simply maintain the system in the desired position.

Accordingly, it is an object of the present invention to provide an electrically controllable positioning system which is characterized by simplicity rather than complexity.

It is another object of the present invention to provide electrically controllable positioning systems which are particularly characterized by low cost of construction in relation to the quality of performance.

Another object of the present invention is to provide electrically controllable positioning systems which are characterized by extremely low standby power drain when holding the desired position.

Another important problem in prior electrical positioning systems has been to obtain sufficient precision in the positioning operation. This problem has been particularly accentuated in the presence of adverse conditions such as increases in friction and other variations in the load or the forces resisting the positioning operation.

Accordingly, it is another object of the present invention to provide electrically controlled positioning systems which are characterized by a very high precision in operation in the face of adverse conditions such as high load friction and high forces resisting positioning, even though such forces may vary.

Another object of the invention is to provide an improved electrical positioning system which is characterized by a high precision in the positioning operation without resort to mechanical position locking devices such as detents and the like.

Another object of the invention is to provide a positioning system which is particularly characterized by high speed and reliability in operation.

Another object of the invention is to provide a positioning system which is characterized by a high degree of stability in operation, and which is free from unstable recycling or hunting malfunctions.

In carrying out the above objects of this invention in one preferred form thereof, there may be employed a commutator movable with the object to be positioned and having at least two commutator segments separated by at least one insulated dwell segment. At least two brush contacts are provided in engagement with the commutator. A selector switch is provided to make a power connection selectively to one of said brushes, and the control for a positioning motor is connected from said brush through the commutator segments. The sense of the connections of the commutator segments is such that the energization of the motor through a commutator segment from a brush in engagement with that segment is in a direction to move the commutator in a direction to position the adjacent dwell segment under the selected commutator brush. In this way, the position of the object to be positioned is established by the positioning of the commutator with the dwell segment at the brush, and the positioning motor is de-energized by the disconnection of the brush from the commutator segments at the dwell segment.

Other features, objects, and advantages of the invention will be apparent from the following description and the accompanying drawings which are as follows.

Figure 1:
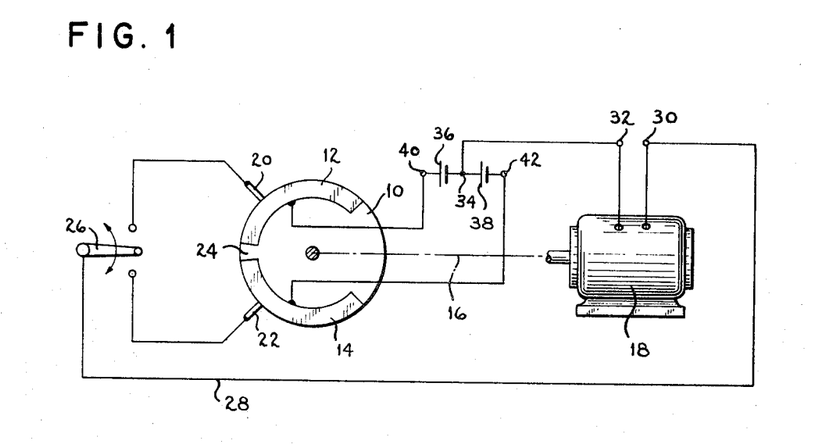
FIG. 1 is a schematic diagram of one of the simplest preferred forms of the present invention.

Referring particularly to FIG. 1, there is shown a rotatable commutator 10 having a set of movable contacts 12 and 14 which constitute commutator contact segments. The commutator 10 is connected for rotation by means of a shaft screматically shown at 16. Shaft 16 constitutes an extension of the shaft of an electric drive motor 18.

A set of fixed contacts consisting of brush contacts 20 and 22 are arranged in engagement with the contact segments 12 and 14 of the commutator 10. Between the contact segments 12 and 14 of the commutator, there is an insulated dwell segment 24. A selector switch 26 is provided having an upper connection to brush contact 20, and a lower connection to brush contact 22. The lever of the switch 26 is connected through a circuit 28 to one terminal 30 of the electric motor 18. The other terminal 32 of the motor 18 is connected to the midterminal 34 of a three terminal DC power source schematically illustrated as DC cells 36 and 38. The outer terminals 40 and 42 of the power source 36–38 are respectively connected to the commutator segments 12 and 14.

In operation, if the selector switch 26 is moved to its upper position to complete the circuit to the brush contact 20, then the motor 18 is energized through the brush 20 and the commutator segment 12 from the power source cell 36. The polarity of this energization is such as to cause rotation of the motor 18 in a direction to cause clockwise rotation of the commutator 10, moving the dwell segment 24 to the brush 20. When the dwell segment 24 reaches the brush 20 the energization of the motor through the segment 12 is discontinued by reason of the insulating properties of the segment 24. The dwell segment 24 is slightly wider than either of the brushes 20 or 22, so that neither of the brushes 20 or 22 ever overlaps the two contact segments 12 and 14. If the motor continues to rotate (by coasting) even though it has been de-energized by the disconnection of the segment 12 from the brush 20, then the segment 14 will connect with brush 20. This will apply a reverse voltage from the power source cell 38 through the brush 20 to the motor 18. Thus, the torque and the rotation of the motor 18 will reverse to bring the commutator dwell segment 24 back to the brush 20. If the combination of the commutator 10 and the rotor of the motor 18 have a high inertia and low friction, the dwell segment 24 can conceivably over-shoot the position of the brush 20 again in a counterclockwise direction. This will again cause energization through segment 12 for clockwise rotation to finally center the dwell segment 24 under the brush 20. Thus, it is apparent that there is always an automatic and dynamic correction for a position error in either direction.

If the selector switch 26 is moved to its lower contact, completing the circuit to brush 22, then the motor 18 will be energized for counterclockwise rotation to bring the dwell segment 24 under the brush 22. The operation on any over-shoot is just as described above. Thus, any energization through segment 14 causes counterclockwise rotation, and any energization through segment 12 causes clockwise rotation to move the dwell segment 24 to the energizing brush 20 or 22.

From the above description, it is apparent that the system of FIG. 1 is a positioning system having two selectable positions corresponding to the positions of the brush contact members 20 and 22.

Figure 2:
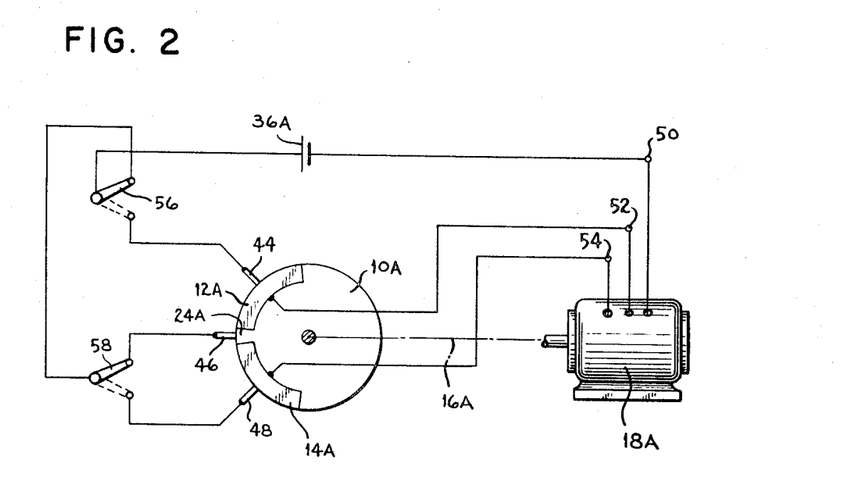
FIG. 2 is a schematic diagram of a modified embodiment of the invention employing a reversible motor and illustrating a system which is operable to three different positions.

FIG. 2 shows another embodiment of a positioning system in accordance with this invention which employs three fixed brushes 44, 46, and 48 which respectively determine three different rotational positions. Parts of the system of FIG. 2 which correspond to those shown in FIG. 1 are identified by similar numbers with the added suffix letter "A." In the embodiment of FIG. 2, rather than having a three terminal reversible power source, the motor 18A is a three terminal reversible motor. Motor 18A has a central terminal 50 and end terminals 52 and 54. Energization of the motor between the central terminal 50 and the end terminal 52 causes clockwise rotation, and energization between the intermediate terminal 50 and the end terminal 54 causes counterclockwise rotation. The use of a three terminal reversible motor with a two terminal power supply, as shown in FIG. 2, is preferred over the use of a two terminal motor and a three terminal power supply, as shown in FIG. 1, for various reasons which will be elaborated upon below.

The two terminal power supply 36A of FIG. 2 is permanently connected to the center terminal 50 of motor 18A, and the other side of this power supply 36A is connected through the switches 56 and 58 to the brushes 44, 46, and 48. The operation of the switches 56 and 58 always causes the application of voltage to only one of the brushes 44, 46, and 48, and in each case, the motor 18A and the commutator 10A are thus caused to rotate in a direction to position the dwell segment 24A beneath the energized brush. It is apparent from FIG. 2 that the upper positions shown for both the switches 56 and 58 cause the application of voltage to the center brush 46. Moving the selector switch 56 to the lower position applies the voltage instead to the brush 44. Alternatively, moving the switch 58 to the lower position applies the voltage to the lower brush 48. The system of FIG. 2 is particularly useful for controlling the steering of various vehicles such as small boats or aircraft. The switches 56 and 58 may then be considered respectively as "right rudder" and "left rudder" controls. These switches may likewise represent the contact levers of remote control relays. The switches 56 and 58 may represent the contact levers of remote control relays for respectively controlling right rudder and left rudder. It is apparent that when neither of these switches is operated, the center brush 46 is energized so as to hold the rudder in the central position for straight ahead steering.

As mentioned above, the use of the three terminal reversible motor, as shown in FIG. 2, is preferred over the use of the three terminal reversible power source 36–38 shown in FIG. 1. The reason for this preference is that there is always a possible risk that the commutator segments 12 and 14, or 12A and 14A, may be bridged over in some way to establish an electrical circuit between them. Although the brushes are narrower than the insulated dwell segments 24 and 24A, there is always a certain danger that minute foreign conductive materials or moisture may cause the bridging inter-connection. If such an interconnection occurs with the three terminal power source, the power source is short-circuited. Furthermore, in the system of FIG. 1, the voltage differential between the segments 12 and 14 increases the hazard of possible arcing conditions in a short circuiting path. By contrast, in the system of FIG. 2, there is no voltage differential between segments 12A and 14A, and the worst that can happen if these segments are bridged is that both sides of the motor 18A are simultaneously energized. Preferably, the motor is designed so as to permit this double energization without harm to the motor.

The systems of the present invention are particularly useful with very small direct current motors such as are often used in instruments and systems which must be restricted in size and weight. Such motors may measure about one inch to one and one-quarter inches in outside diameter, and one and one-half to two inches in length. A permanent magnet may be employed as the motor armature. Motors of this type are commonly available from various suppliers such as Barber-Colman Company of Rockford, Ill. under their product identification codes BYLM, FYLM, DYLM, EYLM, GYLM, HYLM, BYQM, and HYQM. These motors may be constructed for operation at DC voltages of 30 volts or less.

A preferred form of three terminal reversible motor for use in systems of the present invention such as shown in FIG. 2, and other subsequently described figures, is the motor which forms a portion of the subject matter described and claimed in my co-pending United States patent application Ser. No. 303,758 filed Aug. 22, 1963.

The systems of the present invention are also very useful with motors of larger sizes, as will be explained more fully below. Reversible alternating current motors may also be employed instead of DC motors as discussed above.

In the systems of both FIGS. 1 and 2 it is understood that there is some useful load to be positioned which is connected for movement by the motor 18 or 18A. The desired positions of the load in each case are represented by the positions of the brush contacts 20 and 22 or 44, 46, and 48. However, for the sake of simplicity in the drawings, the loads are not illustrated.

It is to be observed that in the embodiment of both FIGS. 1 and 2, in addition to the brush which is positioned over the insulated dwell segment of the commutator at each commutator position, there is always another brush which is positioned in contact with a conductive commutator segment, and which may be selected by means of the selector switch so as to cause rotation of the positioning motor to a new position corresponding to the newly selected brush.

In both FIGS. 1 and 2, the brushes 20, 22, 44, 46, and 48 are illustrated as radial contact brushes for purposes of clarity. However, for commutator discs 10 and 10A as shown in these embodiments, it is actually more practical to have brushes which make contact in an axial direction with the faces of the segments 12, 14, 12A, and 14A. It is entirely feasible, of course, to construct the commutators employed in the systems of the present invention in the form of drums as well as discs. Where drums are used, radial contact brushes are used. It is also entirely feasible to employ a stationary commutator disc or drum, and to move the brushes as a set of movable contacts supported on a yoke. Such a modification is desirable in some instances. Generally, however, it is preferable to use fixed brushes and movable commutators so that no accommodation is necessary for the physical movement of the wired connections to the brushes. As a matter of fact, the permanent connections from the segments 12 and 14 shown in FIG. 1 to the power source terminals 40 and 42 are preferably carried out by means of brushes so as to avoid the problems of moving wired connections. Similarly, the connections from segments 12A and 14A in FIG. 2 to the end terminals 52 and 54 of the motor 18A are preferably carried out by means of brush contacts on the segments.

Figure 3:
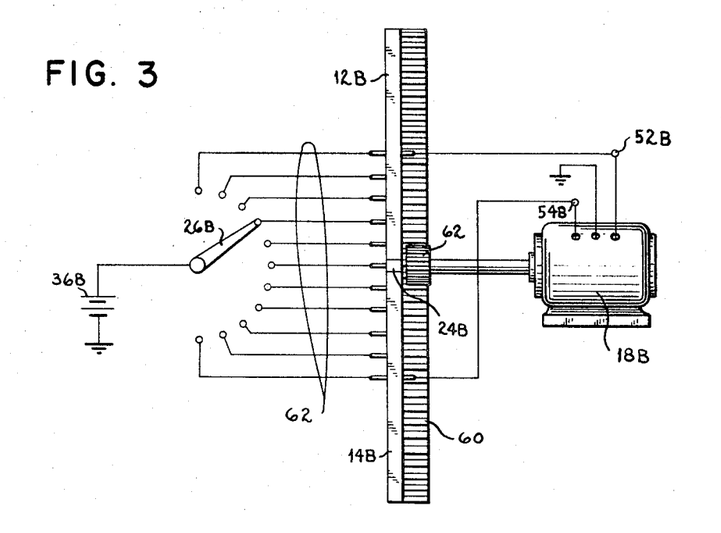
FIG. 3 is a schematic diagram of an embodiment of a positioning system in accordance with the present invention, which is positionable at as many as eleven different selected translation positions.

FIG. 3 illustrates a modification of the embodiment of FIG. 2 in which translational rather than rotational movement is involved. Components similar to those shown in prior figures are similarly numbered with the added suffix letter "B." In this embodiment, the object to be positioned is integral with or connected to, a gear rack 60. The gear rack 60 is driven to various positions by the motor 18B by means of a meshing pinion gear 62. A rectilinear commutator having two segments 12B and 14B and a central insulated dwell segment 24B is arranged for movement with gear rack 60. By means of a selector switch 26B, power may be applied from a power source 36B to any selected one of the brushes generally indicated at 62. Whenever a particular brush is selected, the motor 18B is thereby energized to move the gear rack 60 and the segments 12B and 14B up or down, as the case may be, in order to position the insulated dwell segment 24B opposite to the energized brush. Thus, as many vertical positions may be selected as there are brushes 62.

The switching functions of the selector switch 26B may be carried out by many different switch structures. One particularly desirable structure, for instance, is a push-button switch console of the type in which the operation of any one push-button causes any other depressed push-button to be reset so that only one push-button at a time may be selected and depressed. This substitution of switch structures is also appropriate for the selector switches shown in the other embodiments.

It is one of the interesting features of the present invention that speed-change gearing may be employed between the motor and the object to be positioned; and the position determining commutator such as the commutator of FIG. 3 including segments 12B and 14B, may be connected in closer relationship to the object to be positioned than it is to the positioning motor. Thus, a very precise positioning is obtainable even though there may be substantial lost motion or flexibility in the coupling between the motor and the object to be positioned.

Figure 4:
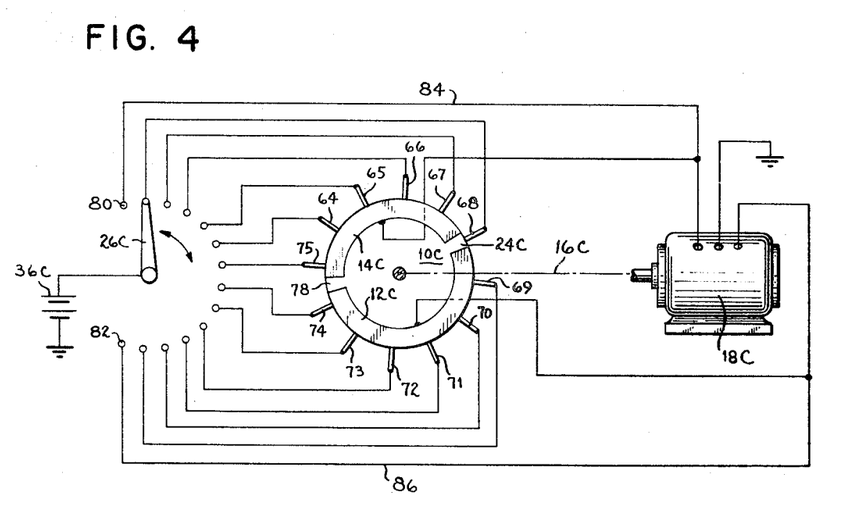
FIG. 4 illustrates another embodiment of the invention for positioning at any one of twelve selected rotational positions.

FIG. 4 illustrates another embodiment of the invention in schematic form which is capable of continuous rotation and positioning at any one of twelve different rotational positions. Components shown in this figure which correspond to components shown in prior figures are similarly numbered with the added suffix letter "C." In this embodiment, twelve brushes 64–75 are equally spaced around the periphery of the commutator disc 10C. By means of the selector switch 26C, any one of the brushes 64–75 may be energized to cause the positioning motor 18C and the commutator disc 10C to rotate until the insulated dwell segment 24C is positioned under the energized brush. If, at the time a new brush is energized, that brush is in contact with the commutator segment 12C, then the motor and the commutator disc 10C rotate in a clockwise direction to bring the dwell segment 24C to the energized brush. Conversely, if the newly energized brush is in contact with the segment 14C, then the commutator 10C rotates in a counterclockwise direction to move the dwell segment 24C to the energized brush.

Since the commutator contact segments 12C and 14C must be insulated from one another at both ends, a second insulated segment must be provided as indicated at 78. Insulated segment 78 is not positioned directly and diametrically opposite to the dwell segment 24C, but is intentionally positioned so as to come between two adjacent brushes such as 74 and 75. In this way, brush 74 is not disabled by being placed upon the insulated segment 78 when the dwell segment 24C is under the brush 68 as shown in the drawing. Thus, every brush is always potentially active to cause the positioning system to rotate to its position. The utility of the system illustrated in FIG. 4 is quite obvious for many different purposes. For instance, the shaft 16C may be connected to position a bank of wafer switches in the twelve different positions commonly provided for by the design of such switches.

Another interesting and unsual feature of the embodiment of FIG. 4 is that the motor 18C may be energized directly for continuous rotation through additional contacts 80 and 82 of the selector switch 26C. These contacts are connected to motor 18C respectively through the connections 84 and 86. The motor is operable for counterclockwise rotation through connection 84, or for clockwise rotation through the connection 86. If the motor is being operated through one of the contacts 80 or 82 for continuous rotation and it is then desired to stop the motor, the switch 26C is moved to one of the other contacts corresponding to the position in which it is desired to have the motor stop. The system then operates as an electrical brake to stop the commutator 10C with the dwell segment 24C under the energized brush. It is a very interesting and important feature of this embodiment of FIG. 4, and of this mode of operation of the system of FIG. 4, that it is not necessary that the motor must be capable of coming to a halt in only a half revolution of reverse torque. The motor may actually continue to rotate for a number of revolutions after the switch 26C has been moved to energize one of the brushes 64–75 to stop the motor. During this interval, the energized brush will cause the motor to be energized with reverse torque for approximately one-half revolution and with forward torque for approximately one-half revolution. Thus, the periods of forward and reverse torque during each revolution of this mode of operation will be of substantially equal duration and will tend to cancel out in terms of total net driving force per revolution. Accordingly the motor will reduce in speed at a rate dependent upon the drag of the load to the point where reverse torque for a period of one-half revolution will be sufficient to cause the motor to actually reverse and progress to the desired stopped position.

Thus the system of FIG. 4 may be further characterized as a motor control system having a dynamic electrically operated brake which causes the motor to stop in a desired indexed position. This function is obviously a useful one for many different purposes.

Again, it may be observed that it is frequently desirable to insert a gear train in the drive connection represented by the shaft 16C. If this is a speed reducing train, then one-half revolution of the commutator disc 10C may represent many revolutions of the motor 18C. Then the stopping operation in an index position, as described above, may occur quite promptly after the selection of a stopping position, without any substantial overshoot.

Figure 5:
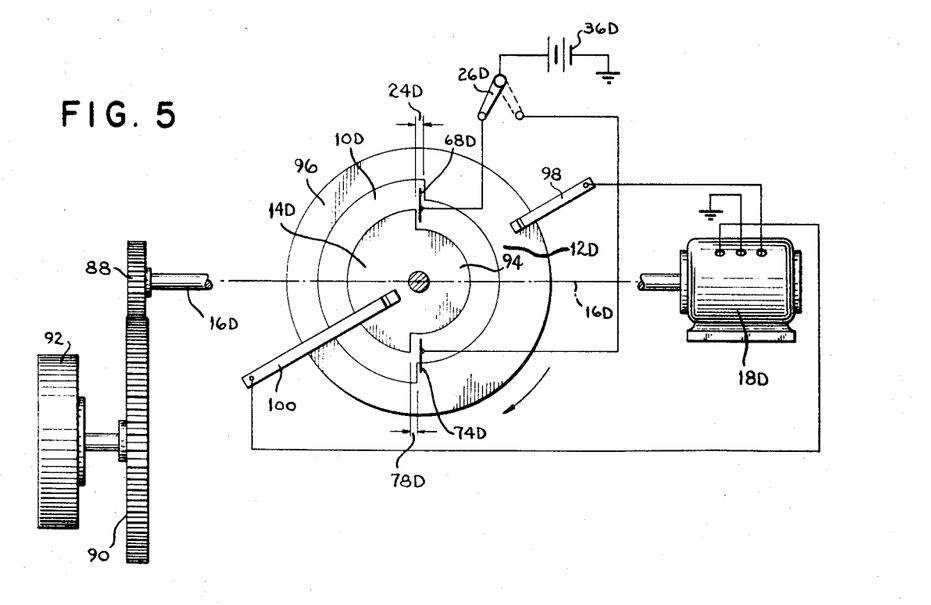
FIG. 5 is a schematic diagram of a further embodiment of the invention which is operable as a stepping motor, providing one-half revolution of the driving motor for each change in the connection of a selector switch.

FIG. 5 illustrates a modification of the system of FIG. 4 in which all of the brushes 64–75 have been omitted except two. These are brushes 68D and 74D corresponding to diametrically opposed brushes 68 and 74 of FIG. 4. All of the components of FIG. 5 which have direct counterparts in prior figures are similarly numbered with the added suffix letter "D." The selector switch 26D is provided with only two contacts to supply the two brushes 68D and 74D. Each time the switch 26D is shifted from one brush to the other, the motor 18D and the associated disc 10D are caused to rotate for one-half turn in the clockwise direction to position dwell segment 24D under the energized brush. As in the embodiment of FIG. 4, the commutator segment 12D encompasses a little more than 180 degrees. Thus, every time the disc 10D is advanced 180 degrees in response to the energization of a new brush in order to bring the dwell segment 24D in alignment with the new brush, then the contact segment 12D is in contact with the other brush and ready to energize the motor for another 180 degree advance whenever the switch 26D is again shifted. Thus, in the system of FIG. 5, each complete cycle of operation of switch 26D to the right, and then again to the left, provides two half revolutions which add up to a full revolution of the motor 18D and the commutator disc 10D. The shaft 16D of FIG. 5 may be extended to a gear train, including gears 88 and 90, which are connected to drive and position a load device 92. The load device 92 may be any device which requires precise positioning and may consist for instance of a bank of rotary switches. These may be the same twelve position wafer switches mentioned in connection with FIG. 4.

While the system of FIG. 5 is shown in schematic form, the commutator disc 10D is illustrated in a form which is not schematic and which may be embodied in a practical physical form. It illustrates a preferred embodiment for the commutator disc for either the system of FIG. 5 or the system of FIG. 4. A particular advantage of this structure is that the segments of the commutator are actually interrupted as segments only at an intermediate radius corresponding to the radial positions of the brushes 68D and 74D. The segment 14D is thus filled in at the central portion of the commutator disc to form a collector ring 94, and the segment 12D is formed as a part of an outer conductive collector ring 96 on the face of the disc 10D. In this way, the segments 14D and 12D are provided with their own collector rings 94 and 96 which may be continuously connected to the motor 18D by means of the collector ring brushes 98 and 100. Thus, the problem of getting rotatable connections from the segments of commutator disc 10D to the motor 18D is very effectively solved.

Figure 6:
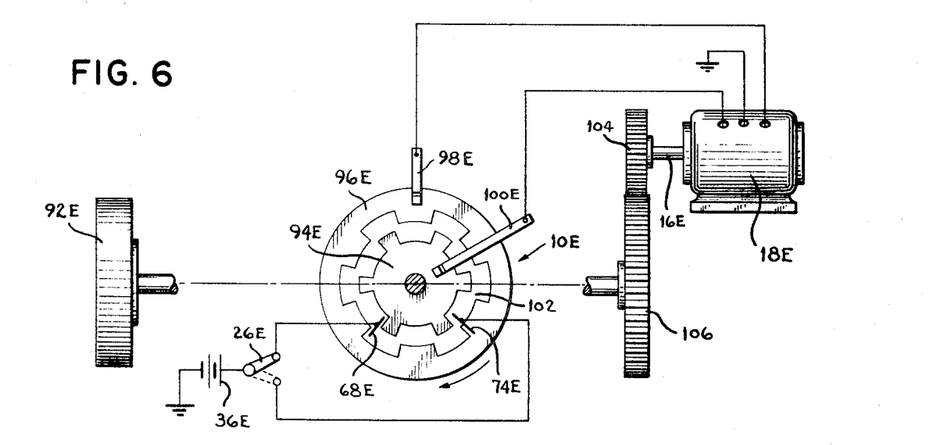
FIG. 6 illustrates another embodiment of the invention in which a commutator disc determines six different positions of a load device to be positioned and in which a gear reduction arrangement is mechanically connected between a positioning motor and the commutator disc.

FIG. 6 illustrates another system embodiment of the present invention which is closely related to the previously described systems. In this figure, components corresponding to those shown in prior figures are given similar numbers with the added subscription letter "E." The major change in this embodiment over the embodiment of FIG. 5 is that there are six commutator segments connected with each of the collector rings 96 and 94 with their collector brushes 98E and 100E. With the division of the commutator into twelve alternately connected segments, a twelve step (rather than a two step) rotational operation of the positioning system is available by repeated reversals of the switch 26E. Every other commutator gap between the conductive segments is to be regarded as a "dwell" segment and operates as such. In the position as shown in FIG. 6, a dwell segment is positioned under brush 68E, as this brush is energized. If the switch 26E is now shifted to the lower position to energize brush 74E, the motor 18E is caused to advance the commutator disc 10E approximately one-twelfth of a revolution until the insulated dwell segment indicated at 102 is accurately positioned beneath the brush 74E. If there is an overshoot in this forward rotation, the inner segment which is formed as part of the collector ring 94E, and which is adjacent to the dwell segment 102, will connect with the brush 74E and cause a reversal of motor 18E to bring the insulated dwell segment 102 back to the brush 74E. Thus, there is a reverse torque positioning and indexing which operates to provide a precise positioning in a step-wise manner as the switch 26E is operated. The load 92E, which is to be positioned, may consist of a rotatable switch, and the entire organization of FIG. 6 may then be referred to as a stepping switch system. The steps of operation provided by the disc 10E may correspond to different switching points. The drive connection 16E may preferably include a train of speed reduction gears such as gears 104 and 106 for higher torque and greater positioning accuracy.

One of the particular advantages of the positioning systems of the present invention is that very precise positioning at a number of rotational positions is achievable without any necessity for the common expedient of employing mechanical detents or spring biased cam followers to establish the desired positions. Such structures are commonly employed with small devices such as the so called wafer switches, and considerable additional operating energy is required for rotating these switches because of the detent structures. The present invention completely avoids this because it provides precise positioning without the detent feature.

Figure 7:
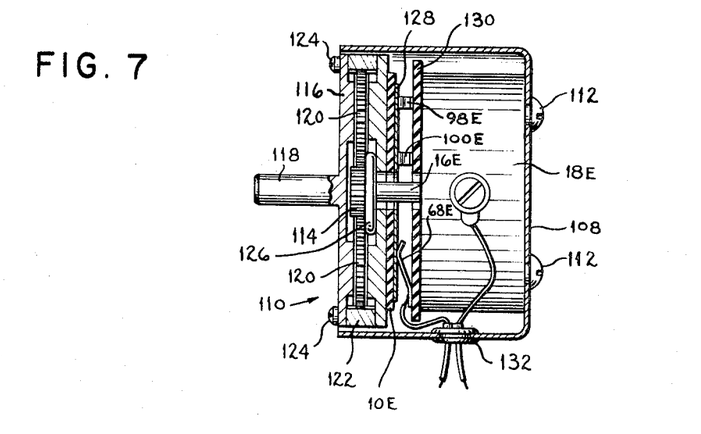
FIG. 7 is a side view, partially in section, showing a preferred physical arrangement of the motor in combination with the gear train and the commutator parts which may be employed in carrying out the embodiment of the system shown schematically in FIG. 6

FIG. 7 is a cross-sectional view, partly in section, showing a preferred physical arrangement for all of the components of a system such as that of FIG. 6 exclusive of the power source 36E and the load 92E. These components are all combined in a common housing 108. They include the motor 18E, a planetary gear train generally indicated at 110 which corresponds to the gears 104 and 106 of FIG. 6, and the commutator disc 10E.

The motor 18E is mounted and supported in the casing 108 by means of mounting screws 112. The motor shaft 16E is provided with a pinion gear 114. Surrounding the pinion gear 114, and supported for rotation thereon, there is a combined gear assembly and end bell 116 including an output shaft 118. The gear assembly 116 includes planet gears 120 (preferably three in number) which mesh with the pinion gear 114, and a main gear ring 122 which is rigidly mounted with the body of the housing 116 by means of screws 124. The screws 124 preferably extend through the gear 122 and thus serve to assemble both sides of the gear assembly and the main gear 122 together in a rigid assembly. The entire gear assembly is firmly mounted upon the motor shaft 16E by engagement with a collar member 126 which is formed as a part of the pinion gear 114 on the motor shaft 16E. This collar member 126 is in sliding engagement with the side edges of the planet gears 120 and the inner surface of the adjacent portions of the gear housing 116. These engagements of the collar 126, together with the engagement of the pinion gear 114 with the three planet gears 120, are sufficient to precisely position the gear assembly and support it upon the motor shaft 16E.

The commutator disc 10E is firmly fastened to, and supported upon, the inner surface of the gear assembly 116, and thus it is rotated together with the gear assembly and the output shaft 118. The main body of the disc consists of insulating material. The conductive portions of the commutator disc may consist of thin metallic films, as indicated at 128, upon the inner face of the commutator disc 10E. The front face of the motor 18E is provided with a fixed disc of insulation material 130 to which are attached the various fixed contact brush members 98E, 100E, and 68E. Brushes 98E and 100E are wired directly to the windings of the motor 18E. Wiring connections are provided to the exterior of the motor by means of the wires which are shown extending through the grommet 132 at the bottom of the case 108.

Figure 8:
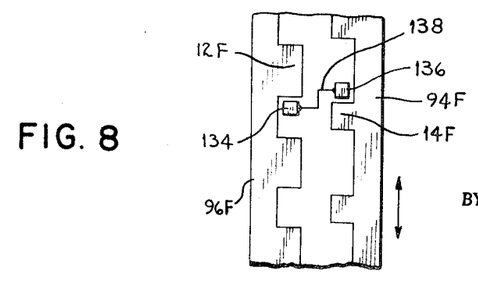
FIG. 8 is an enlarged detail view illustrating an embodiment of commutator and brush structures which may be employed in connection with the systems of the present invention.

FIG. 8 is a partial detail view showing a commutator structure similar to that of FIG. 6, but which is formed in a straight translational version, rather than in a circular disc form. The structure includes two continuous conductive strips 94F and 96F. These conductive strips respectively have commutator segments 14F and 12F formed as parts thereof. In this modification of FIG. 8, the brush member consists of two parts 134 and 136 which are electrically interconnected as indicated at 138. Brush part 134 is arranged to contact only the commutator segments 12F associated with continuous strip 96F. Similarly, brush part 136 is arranged to contact only commutator segments 14F associated with strip 94F. The brush parts 134 and 136 may be individually adjustable in the direction of movement to establish greater precision in positioning and a close match in the effective width of the insulated dwell segment of the commutator and the commutator brush. It is apparent also that when this structure is employed having separate parts 134 and 136 for the commutator, the commutator segments 14F and 12F need not necessarily be in alignment at their edge portions, but the configuration of these commutator segments must be consistent.

Figure 9:
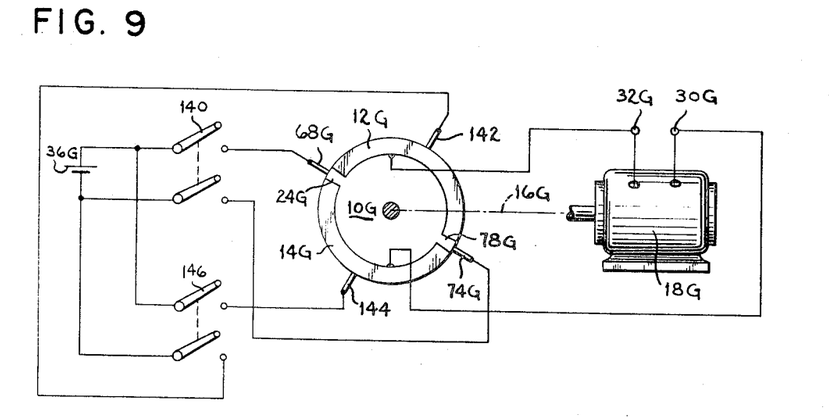
FIG. 9 is a schematic diagram of another embodiment of the invention which employs a two terminal motor and a two terminal power supply.

FIG. 9 is a schematic diagram illustrating an embodiment of the invention which does not require the employment of a three terminal motor or a three terminal power supply. Two terminal devices are sufficient in this embodiment. Parts of the system of FIG. 9 corresponding to similar parts previously shown in other embodiments are similarly numbered with the added suffix "G." In this embodiment, two diametrically opposed brushes 68G and 74G are energized from the power supply 36G by means of a double-pole switch 140. When these brushes are energized, if the commutator disc 10G is in any position other than the position shown, these brushes transmit power through the commutator segments 12G and 14G to the motor 18G to cause the motor to rotate to the desired position as shown. Another pair of diametrically positioned brushes 142 and 144 are connected for energization from the power source 36G through the double-pole switch 146. If the commutator 10G is in the position as shown in the drawing and the switch 146 is closed, then the motor is energized through the commutator segments 12G and 14G to rotate the commutator 10G until the dwell segments 24G and 78G are positioned in alignment with the brushes 142 and 144.

The polarity of the connections between the switch 146 and the brushes 142 and 144 may be such as to energize the motor 18G for rotation in either direction, as may be desired.

The selector switches 140 and 146 are obviously not intended to be simultaneously closed. Preferably they may be mechanically interlocked so that they cannot be simultaneously closed. With the arrangement as shown, it is apparent that the motor 18G is energized to move the disc 10G back and forth through an angle of approximately 90 degrees on each movement between selected positions. In one of these positions, the dwell segments 24G and 78G are aligned with the brushes 68G and 74G in response to closure of the switch 140, and in the other position the dwell segments 24G and 78G are aligned with brushes 144 and 142 in response to closure of the switch 146. Thus, the positioning movements align the two dwell segments with two brushes rather than aligning one dwell segment with a single brush.

It is quite apparent that additional pairs of brushes may be provided in the system of FIG. 9 so as to provide for the selection of additional rotational positions. It is also quite apparent that if the commutator is divided into multiple segments and additional pairs of brushes are provided, stepwise rotation in a single direction may be obtained, if desired.

The commutators of the present invention may be formed in many different physical configurations and by many different methods. The circular configurations may be formed on a surface of a cylinder or cone, or on an axial face of a disc, as illustrated in FIGS. 5 and 6. With any of the structures, but particularly when the commutator is formed on a flat surface, the structure may be very conveniently formed by photographic circuit techniques which are well known. In accordance with these methods, it is simply necessary to produce a clear drawing of the patterns of conductive surfaces which are desired, and then to proceed with the photographic steps.

All of the embodiments disclosed by reference to the drawings of this application generally involve geometrically uniform and symmetrical commutator configurations. In particular, the commutator disc of FIG. 6 provides for six (or twelve) uniformly spaced indexing positions. However, it is quite clear that it would be entirely within the scope and spirit of the present invention to form a commutator disc having various non-uniform spacings for the indexing positions in accordance with any desired arrangement. Thus, the spacing between indexing positions may be proportional to any desired linear or non-linear function, or may correspond to a particular desired control sequence having some long and some short positioning movements.

A number of the embodiments of this invention, such as those disclosed in FIGS. 1, 2, 5, and 6 are operable to accomplish a position change in response to a single shift in the position of a single pole switch member. It is quite apparent that this switching function can be provided not only by mechanical switching members, as illustrated, but also by electronic multistable circuits, such as are commonly referred to as "Flip-Flop" circuits, and which are extensively used in digital computers and other control and logic circuits. Thus, the output of the systems of the present invention can be an output which is controlled by computer logic. Furthermore, in a system such as that of FIG. 6, in which individual steps or pairs of steps in the advancement of the commutator disc occur in response to steps or cycles of operation of the input signal switch, it is apparent that the apparatus can be employed for the accomplishment of logical functions. For instance, the rotation of the commutator disc and the associated load can serve the function of a counter. It can also be employed for various purposes associated with logical computer machinery such as for provding physical positioning of the character wheel of a print-out apparatus, for instance.

Furthermore, the apparatus of the present invention, particularly as characterized by the embodiment of FIG. 6, may also be employed to accomplish logical functions, such as counting, in response to input signals in the form of mere pulses on the input lines, instead of steady state signals such as are available from "Flip-Flop" circuits.

It has been suggested above that various speed changing gear arrangements may be incorporated in systems according to the present invention, between the motor and the load device to be positioned. It is particularly advantageous to have the commutator disc closely associated with the load device to be positioned so as to accomplish precise positioning of the load despite possible lost motion in any gearing or drive connections to the motor. However, it is also possible, and often desirable, to have the commutator disc in a high speed part of the system, and to couple the commutator disc to the object to be positioned through speed-reducing gears. The speed of the commutator disc in such a system may be the same as the speed of the motor, as illustrated in FIG. 5, or it may be somewhat different from the speed of the motor. In either case, the higher speed of the disc provides a vernier effect to increase the accuracy of positioning of the load device by reason of the amplification of motion of the commutator disc.

All of the embodiments of the present invention discussed above have been related to the direct connection of a power source to an electric motor through the commutator embodied in each system of the invention. This assumes necessarily that the motor is small in size and low in power, particularly if the commutator is formed by printed circuit techniques involving thin conductive film commutator segments. As a matter of fact, the present invention is particularly useful with the very small motors such as were described above and having horsepower ratings in the range below one-tenth of a horsepower, and often in the order of one-twentieth of a horsepower and less.

However, it is quite apparent that power amplifying apparatus of various kinds may be employed in the systems of the present invention between the commutator brushes and the motor. Thus, electronic amplifiers, relays, and heavy industrial contactors may be provided singly, or in cascade connections, to build up the steps of amplification to control electrical positioning motors of almost any size which is desired. For instance it is possible to control the positioning of the rudder of a full size naval vessel by means of one of the positioning systems of the present invention, with suitable amplification in the motor circuit.

Furthermore, once it is appreciated that it is feasible to provide some form of amplification in the motor circuit, it is obvious that it is not absolutely necessary that the output motor is an electrical motor. For instance, the amplifier in the motor circuit may consist of an electromagnetically operable hydraulic control valve, and the output motor may then be a hydraulically operable positioning motor. As another alternative, the system may operate through the medium of electrically operable clutches to selectively obtain rotation in either one direction or the other for the output shaft.

In connection with the above observations, it is quite apparent that translational, as well as rotational motors may be employed in positioning systems in accordance with the present invention. Furthermore, as illustrated in FIG. 3, the commutator structure itself may be arranged for translational rather than rotational movement.

All of the descriptions of the various embodiments of this invention have been given in terms of a moving commutator, with moving contact segments co-operating with fixed contact brush members. However, it is obvious that the commutator segments may be fixed and the brush members may be movable with relation to the commutator while supported by a yoke arrangement. Also, for certain control functions, it may be desirable to have both the commutator and the brushes movable. The main requirement is that provision must be made for relative movement between the brushes and the commutator.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A stepping motor which is operable to move unidirectionally in fixed positional increments comprising motor means, said motor means including a commutator comprised of an insulated substrate having two spaced current collector conductors formed thereon, each of said current collectors having a set of spaced transverse segments of conductive material extending toward the other one of said current collectors, said extending segments of each of said current collectors being positioned in alternating relationship with said extending segments of the other one of said current collectors, the insulation substrate material of said commutator between adjacent ones of said commutator segments forming insulated dwell segments of said commutator, collector brush contact members in engagement with said current collectors and connected to energize said motor means respectively in the forward and reverse directions, said brush contact members being positioned in engagement with said commutator to separately engage the members of both sets of said commutator segments, the members of one set of said commutator segments having a greater width than the members of the other set, said commutator brush members being respectively positioned to span between them an angle which is slightly greater than the distance from the trailing edge of one of said wider commutator segments to the leading edge of one of the other ones of said wider commutator segments, selector switching means connected to said commutator brushes and operable to be selectively switched to any one of said commutator brushes, and a power source connected to provide power to said selector switch for connection to said selected commutator brush.

2. An electrically operable stepping switch comprising at least one bank of fixed contacts and a rotatable contact arranged to engage said fixed contacts in various rotational positions, a motor means connected to said rotatable contact to position said rotatable contact at the various fixed contact positions in a step-wise manner, said motor means including a rotation control commutator having a plurality of commutator segments spaced apart in a circular pattern, the adjacent segments of said commutator being separated by insulated dwell segments, a separate one of said dwell segments of said commutator being angularly positioned to correspond to the angular position of each of said fixed contacts, said commutator contact segments being divided into two sets, the members of said two sets being arranged in alternating sequence around the circular pattern of said commutator and the members of each set being connected together in a common circuit, said common circuits being connected to control forward and reverse operation of the drive motor, at least two brush members positioned in engagement with said commutator, said brush members being spaced apart in such relation to the spaces occupied by the members of one of said sets of commutator segments so that one of said brushes is always in engagement with one of said commutator segments of said set when the other of said brushes is in alignment with one of said commutator dwell segments, a selector switch, a power source connected to said selector switch, said selector switch being connected to selectively apply power from said power source to either one or the other of said brushes to thereby energize said motor means through said commutator segments.

3. A stepping motor which is operable to advance in fixed positional increments comprising motor means, said motor means including a commutator disc comprised of a substrate of insulation material having two spaced concentric conductive collector rings formed thereon, the inner one of said collector rings having radially outwardly extending portions of conductive material at angularly spaced positions around the periphery thereof, the outer one of said collector rings having radially inwardly extending conductive portions at angularly spaced positions around the inner limits thereof which alternate with the extensions of said inner collector ring, said extensions of said collector rings forming commutator segments upon said disc, the insulation substrate material of said disc between adjacent ones of said commutator segments forming insulated dwell segments of said commutator, collector brush contact members in engagement with said collector rings and connected to energize said motor means in the forward and reverse directions, commutator brush contact members positioned in engagement with said commutator disc and radially positioned to engage both sets of said commutator segments, the members of one set of said commutator segments having a greater angular width than the members of the other set, said commutator brush members being respectively angularly positioned to span between them an angle which is slightly greater than the angular distance from the trailing edge of one of said wider commutator segments to the leading edge of one of the other ones of said wider commutator segments, selector switching means connected to said commutator brushes and operable to be selectively switched to any one of said commutator brushes, and a power source connected to provide power to said selector switch for connection to said selected commutator brush.

References Cited
UNITED STATES PATENTS

| | | | |
|---|---|---|---|
| 2,884,581 | 4/1959 | Schunemann et al. | 318—265 XR |
| 3,142,009 | 7/1964 | Novak | 318—28 |
| 3,286,146 | 11/1966 | Ohlsen et al. | 318—33 XR |
| 3,313,993 | 4/1967 | Rupp | 318—254 |

BENJAMIN DOBECK, *Primary Examiner.*